United States Patent
Read

(10) Patent No.: US 8,296,240 B2
(45) Date of Patent: Oct. 23, 2012

(54) DIGITAL RIGHTS MANAGEMENT DONGLE

(75) Inventor: Christopher Jensen Read, San Diego, CA (US)

(73) Assignees: Sony Corporation, Tokyo (JP); Sony Electronics Inc., Parkridge, NJ (US)

(*) Notice: Subject to any disclaimer, the term of this patent is extended or adjusted under 35 U.S.C. 154(b) by 0 days.

(21) Appl. No.: 11/690,086

(22) Filed: Mar. 22, 2007

(65) Prior Publication Data

US 2008/0235140 A1    Sep. 25, 2008

(51) Int. Cl.
*G06F 21/00* (2006.01)

(52) U.S. Cl. ................... 705/59; 705/51; 705/57
(58) Field of Classification Search ............... 705/57–59
See application file for complete search history.

(56) References Cited

U.S. PATENT DOCUMENTS

| | | | |
|---|---|---|---|
| 5,629,980 A * | 5/1997 | Stefik et al. ............... 705/54 |
| 5,892,900 A * | 4/1999 | Ginter et al. ............... 726/26 |
| 6,226,618 B1 * | 5/2001 | Downs et al. ............... 705/51 |
| 6,230,267 B1 * | 5/2001 | Richards et al. ............. 713/172 |
| 6,550,001 B1 | 4/2003 | Corwin et al. |
| 6,550,011 B1 | 4/2003 | Sims, III |
| 6,615,347 B1 | 9/2003 | de Silva et al. |
| 6,618,808 B1 | 9/2003 | Johnson et al. |
| 6,779,115 B1 | 8/2004 | Naim |
| 6,920,567 B1 | 7/2005 | Doherty et al. |
| 6,944,766 B2 | 9/2005 | Hamada |
| 6,944,776 B1 | 9/2005 | Lockhart et al. |
| 6,981,262 B1 | 12/2005 | DeMello et al. |
| 7,020,704 B1 | 3/2006 | Lipscomb et al. |
| 7,028,009 B2 | 4/2006 | Wang et al. |
| 7,028,127 B2 | 4/2006 | Kang et al. |
| 7,028,187 B1 | 4/2006 | Rosen |
| 7,136,945 B2 | 11/2006 | Gibbs et al. |
| 7,278,165 B2 | 10/2007 | Molaro |
| 7,415,439 B2 | 8/2008 | Kontio et al. |
| 7,426,494 B2 | 9/2008 | Ohmori et al. |
| 7,493,291 B2 | 2/2009 | Simelius |
| 2002/0013940 A1 * | 1/2002 | Tsukamoto et al. ............. 725/5 |
| 2002/0019814 A1 | 2/2002 | Ganesan |
| 2002/0032905 A1 | 3/2002 | Sherr et al. |
| 2002/0046181 A1 | 4/2002 | Story, Jr. et al. |
| 2002/0065780 A1 | 5/2002 | Barritz et al. |
| 2002/0083318 A1 | 6/2002 | Larose |
| 2002/0107941 A1 | 8/2002 | Katz et al. |

(Continued)

FOREIGN PATENT DOCUMENTS

EP    1473617 A2    11/2004

(Continued)

OTHER PUBLICATIONS

Marx International Inc.;USB an Serial Security Key for Linux; htt:// www.dongles.com/Linux_Dongles.htm; 1995-2005.

(Continued)

*Primary Examiner* — Calvin L Hewitt, II
*Assistant Examiner* — Zeshan Qayyum

(57) ABSTRACT

A dongle for digital rights management protection, in accordance with one embodiment of the present technology, includes a digital right management engine and an encryption/decryption engine. The digital rights management engine is adapted to port digital rights management rules of a source of content to digital rights management rules enforced by the digital rights management engine. The encryption/decryption engine is adapted to re-encrypting the source of content into a managed copy of the content, wherein the managed copy of the content is locked to the dongle.

11 Claims, 6 Drawing Sheets

U.S. PATENT DOCUMENTS

| | | |
|---|---|---|
| 2002/0152393 A1 | 10/2002 | Thoma et al. |
| 2003/0004885 A1 | 1/2003 | Banerjee et al. |
| 2003/0014630 A1 | 1/2003 | Spencer et al. |
| 2003/0018491 A1 | 1/2003 | Nakahara et al. |
| 2003/0028639 A1 | 2/2003 | Yamamoto et al. |
| 2003/0046568 A1 | 3/2003 | Riddick et al. |
| 2003/0078891 A1 | 4/2003 | Capitant |
| 2003/0167392 A1 | 9/2003 | Fransdonk |
| 2003/0233561 A1 | 12/2003 | Ganesan et al. |
| 2004/0148424 A1 | 7/2004 | Berkson et al. |
| 2004/0168056 A1 | 8/2004 | Dillaway et al. |
| 2004/0171533 A1 | 9/2004 | Zehentner et al. |
| 2004/0172533 A1 | 9/2004 | DeMello et al. |
| 2004/0198494 A1 | 10/2004 | Nguyen |
| 2005/0137984 A1 | 6/2005 | Nguyen et al. |
| 2005/0210261 A1 | 9/2005 | Kamperman |
| 2005/0216763 A1* | 9/2005 | Lee et al. ............. 713/200 |
| 2005/0289072 A1 | 12/2005 | Sabharwal |
| 2006/0047603 A1 | 3/2006 | Fontijn |
| 2006/0059105 A1 | 3/2006 | Ebihara et al. |
| 2006/0069749 A1 | 3/2006 | Herz et al. |
| 2007/0038576 A1 | 2/2007 | Lee |
| 2007/0073694 A1 | 3/2007 | Picault et al. |
| 2007/0079380 A1 | 4/2007 | Kawaguchi et al. |
| 2007/0089151 A1 | 4/2007 | Moore et al. |
| 2007/0089174 A1 | 4/2007 | Bader et al. |
| 2007/0094737 A1 | 4/2007 | Larsson et al. |
| 2007/0219917 A1 | 9/2007 | Liu et al. |
| 2007/0255580 A1 | 11/2007 | Cole et al. |
| 2008/0071690 A1* | 3/2008 | Lee et al. ............. 705/59 |

FOREIGN PATENT DOCUMENTS

| | | |
|---|---|---|
| EP | 001712978 | 12/2006 |
| EP | 001045388 | 11/2009 |
| WO | WO0106699 A2 | 1/2001 |
| WO | WO03/019334 A2 | 3/2003 |

OTHER PUBLICATIONS

Geer, David, Digital Rights Technology Sparks Interoperability Concerns, 2004, IEEE, pp. 20-22.

Lingyun, et al. Incremental Learning of Decision Rules Based on Rough Set Theory, 2001, IEEE, pp. 420-425.

Mendes, et al. A New Approach to the X.509 Framework: Allowing a Global Authentication Infrastructure without a Global Trust Model, 1995, IEEE, pp. 172-189.

* cited by examiner

DIGITAL RIGHTS MANAGEMENT DONGLE

BACKGROUND OF THE INVENTION

Computing devices have made significant contributions toward the advancement of modern society and are utilized in a number of applications to achieve advantageous results. Numerous devices, such as TVs, DVD players, game consoles, computers and the like have facilitated increased consumption of content in most, areas of entertainment, education, business and science. Computing devices have also made it faster, easier and cheaper to access content of all types in digital form. The convenience of having content, more readily accessible typically results in users accessing content more often and may also result in users acquiring ever-increasing amounts of content.

However, computing devices also make it easier, faster and cheaper to pirate digital media. Furthermore, unlike content on physical media such as paper and media in analog format, digital media may be exactly reproduced multiple times without degradation. To continue to make content more accessible and encourage greater use and consumption, protective schemes are employed against piracy of digital content while maintaining the accessibility of the content. Conventional protective schemes have included software based encryption and/or tamper-resistant hardware. The conventional protective schemes have also been specific to a particular platform. In addition, the conventional protective schemes are vulnerable to attack. For example, the software implementations can be bypassed, the encryption keys have been found in the clear or even hidden in the device's memory, and the like. Therefore, there is a continuing need for improved digital rights management schemes.

SUMMARY OF THE INVENTION

Embodiments of the present invention are directed toward digital rights management protection techniques locked to an encryption/decryption dongle. In one embodiment, a method of enforcing digital rights management includes receiving source encrypted content on an input device (e.g., DVD drive) of a computing device. The source encrypted content is transferred from the computing device to a dongle. The dongle translates a set of DRM rules associated with the source encrypted content to a set of rules associated with the dongle. The dongle also re-encrypts the source encrypted content into a managed copy of the content locked to the dongle. The managed copy of the content may then be transferred from the dongle to the computing device for storage locally on the computing device. The method may also include transferring the managed copy from the computing device back to the dongle. The dongle re-encrypts the managed copy of the content into a rendering copy of the content locked to a video card of the computing device. The rendering copy of the content may then be transferred from the dongle to the video card for rendering on a monitor.

In another embodiment, a method of enforcing digital rights management includes receiving source encrypted content on an input device (e.g., DVD drive) of a computing device. The source encrypted content is transferred from the computing device to a dongle. The dongle translates a set of DRM rules associated with the source encrypted content to a set of rules associated with the dongle. The dongle also re-encrypts the source encrypted content into a rendering copy of the content locked to a video card of the computing device. The rendering copy of the content may then be transferred from the dongle to the video card for rendering on a monitor.

In yet another embodiment, a dongle is adapted to be communicatively coupled to a personal computer, laptop computer, game console, home entertainment system, hand-held gaming unit, digital video recorder, personal digital assistant (PDA), cell phone, portable audio player (e.g., MP3 players), server computer, client computer, minicomputer, mainframe computer, distributed computer system and the like. The dongle includes a digital right management engine and an encryption/decryption engine. The digital rights management engine is adapted to port digital rights management rules associated with a source of content to digital rights management rules enforced by the digital rights management engine. The encryption/decryption engine is adapted to re-encrypting the source encrypted content into a managed copy of the content. Accordingly, the managed copy of the content is locked to the encryption/decryption engine.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
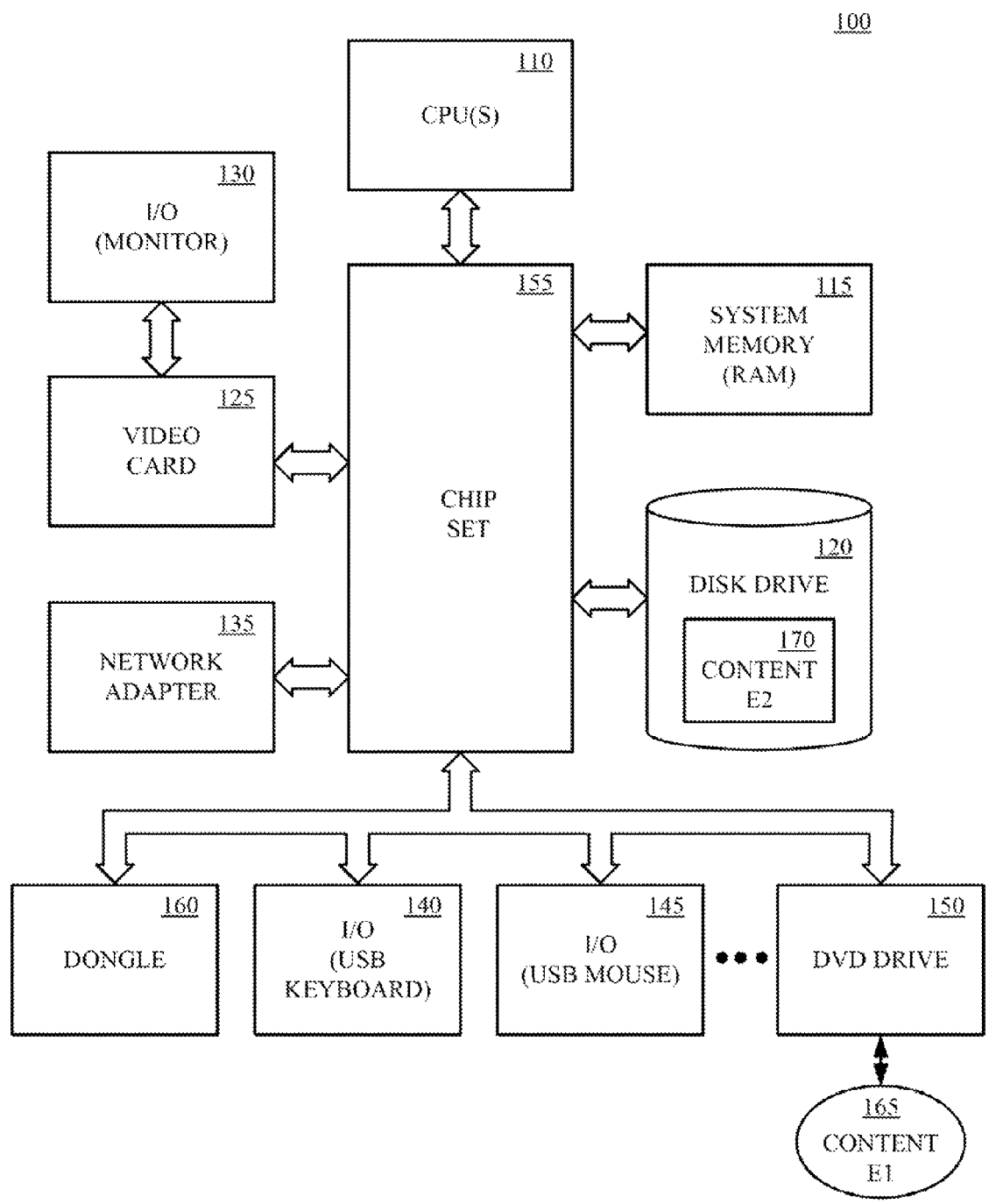
FIG. 1 shows a block diagram of an exemplary computing device for implementing embodiments of the present technology.

Referring to FIG. 1, an exemplary computing device 100 for implementing embodiments of the present technology is shown. The computing device 100 may be a personal computer, laptop computer, game console, home entertainment system, hand-held gaming unit, digital video recorder, personal digital assistant (PDA), cell phone, portable audio player (e.g., MP3 players), server computer, client computer, minicomputer, mainframe computer, distributed computer system or the like. The computing device 100 includes one or more processors (e.g., CPU) 110, one or more computing device-readable media 115, 120 and one or more input/output (I/O) devices 125-150. The I/O devices 125-150 may include a video card 125 and/or graphics processing unit (GPU), a monitor 130, a network adapter (e.g., Ethernet card) 135, a keyboard 140, a pointing device 145, a CD drive, a game controller (e.g., joystick), a DVD drive 150 and/or the like.

The computing device-readable media 115, 120 and I/O devices 125-150 may be communicatively coupled to the processor 110 by a chip set 155 and one or more busses. The chipset 155 acts as a simple input/output hub for communicating data and instructions between the processor 110, the computing device-readable media 115, 120, and I/O devices 125-150.

The computing device-readable media 115, 120 may include secondary memory, such as a magnetic and/or optical storage, that provides for non-volatile storage of computing device-executable instructions and data for use by the computing device 100. For instance, a hard disk drive 120 may store the operating system (OS), one or more applications and associated data. The computing device-readable media 115, 120 may also include primary memory, such as the system memory 115 and/or graphics memory, which provides for volatile storage of computing device-executable instructions and data for use by the computing device 100. For instance, the random access memory (RAM) 115 may temporarily store a portion of the operating system, a portion of one or more applications and associated data that are currently used by the CPU 110, GPU and the like.

The computing device 100 may also include a dongle 160, which is a secure local re-encryption engine. The dongle 160 includes a signed digital certificate verifying its security. The dongle 160 may be removably coupleable (e.g., external peripheral device) to the computing device 100. For instance, the dongle 160 may be a small form factor peripheral that can be readily coupled to and uncoupled from a universal serial (USB) port, a FireWire port, or the like. The use of USB or FireWire advantageously provides power from the computing device 100 for operation of the dongle 160. In another implementation, the dongle may be integrally coupled to the computing device 100. For instance, the dongle 160 may be an internal peripheral device, or an integrated circuit within the chipset 155.

Figure 2:
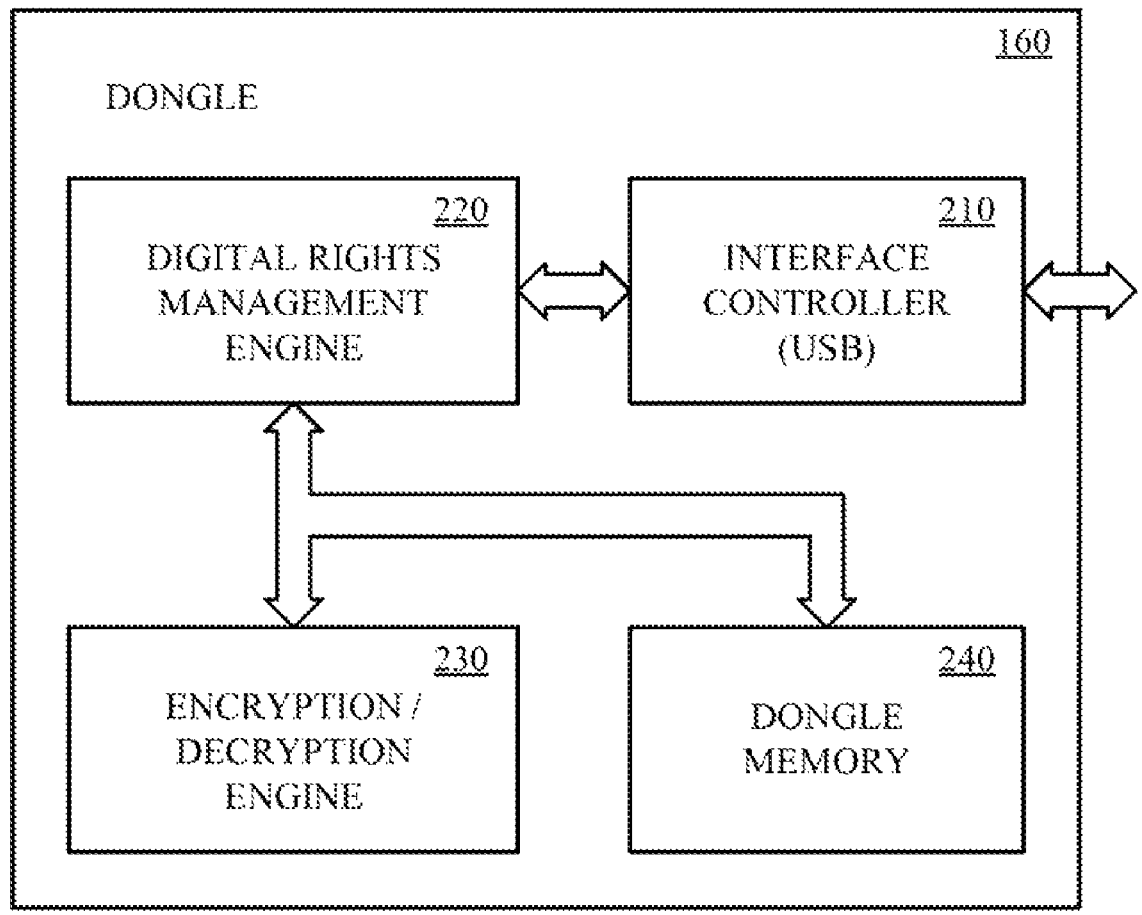
FIG. 2 shows a block diagram of a dongle, in accordance with one embodiment of the present technology.

Referring now to FIG. 2, a dongle, in accordance with one embodiment of the present technology, is shown. The dongle 160 includes an interface controller 210, a digital rights management engine 220, an encryption/decryption engine 230 and dongle memory 240. The dongle memory 240 is computing device-readable media and is not accessible outside of the dongle 160.

The interface controller 210 is adapted to receive source encrypted content from the computing device 100 and send a managed copy and or rendering copy to the computing device 100. The digital rights management (DRM) engine is adapted to port the DRM rules of the source content to the DRM rules enforced by the DRM engine so that the managed copy of the content is locked to the encryption/decryption engine of the given dongle. The DRM engine 220 in combination with the interface controller 210 may also be adapted to establish a secure communication channel. The establishing the secure communication channel may include sending and/or receiving authentication certificates, session keys or the like. In one implementation, the interface may be a USB. In such case the interface controller 210 would have a standard application programming interface (API) for creating the secure communication channel that included exchanging certificates and negotiating session keys. However, while the communication channel is maintained via software, neither the keys nor the content is available in the clear.

The encryption/decryption engine is adapted to decrypt the source encrypted content and re-encrypt the content into the managed copy. The dongle memory 240 is adapted to store one or more encryption keys, authentication certificates and the like for use by the digital rights management engine 220 and/or the encryption/decryption engine 230. The dongle memory 240 is also adapted to store the source content, the managed copy of the content and any content in the clear during processing by the encryption/decryption engine 230.

Figure 3:
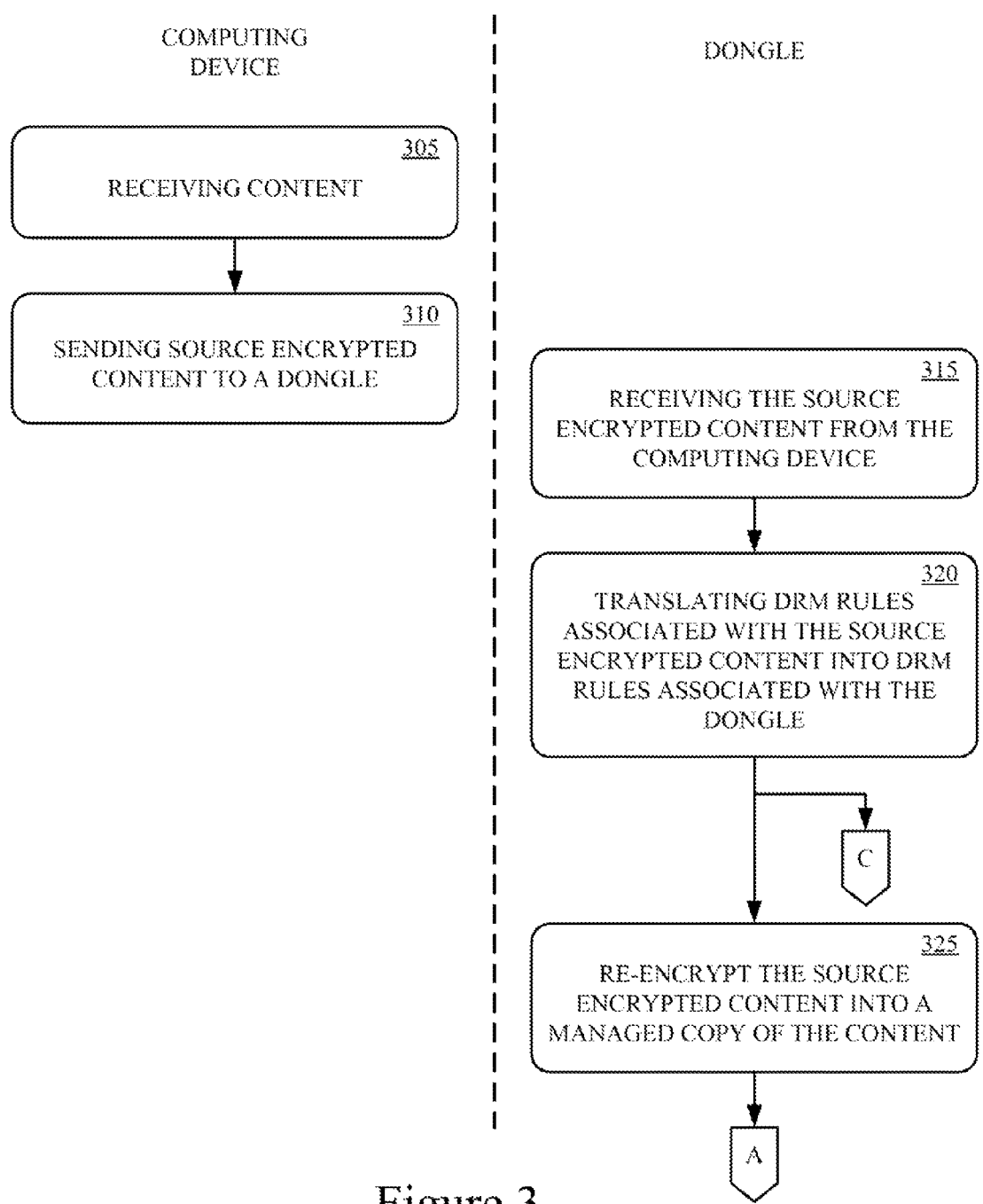
FIGS. 3, 4, 5 and 6 show a flow diagram of a method of digital rights management, in accordance with one embodiment of the present technology

Operation of the computing device 100 in combination with the dongle 160 will be further described herein with reference to FIGS. 3, 4, 5 and 6. FIGS. 3, 4, 5 and 6 show a method of digital rights management, in accordance with one embodiment of the present technology. Referring now to FIG. 3, the method begins with receiving content 165 by a computing device 100, at 305. As shown in FIG. 1, the content may be received on the DVD drive 150 of the computing device 100. However, the example illustrated in FIG. 1 is not intended to limit the device or peripheral that the content is received on or the source of the content. The content 165 may be downloaded (e.g., an electronic file transfer), received on a computing device-readable media (e.g., DVD, CD or the like) or by any other similar means. The content may be music, movies, pictures, documents, data, software and/or the like. When the content includes source encrypted content 165, the content 165 is sent to the dongle 160, at 310. The source encrypted content 165 may also include or have associated with it a set of DRM rules that govern the use of the content, and metadata describing the content. The metadata is also used to manipulate the content. For example, the metadata may specify the start of chapters and/or section in a movie and can be used to start playback at a particular chapter or section.

At 315, the dongle 160 receives the source encrypted content 165 from the computing device 100. For instance, a DVD may be inserted into the DVD drive 150 of the computer 100. The source encrypted content 165 is transferred from the DVD to the dongle 160, In one implementation, the source encrypted content 165 is transferred across a secure communication channel negotiated between the input device (e.g., DVD drive 150) and the dongle 160.

The DRM engine 220 of the dongle 160 translates the DRM rules associated with the source encrypted content 165 into DRM rules associated with the dongle 160, at 320. The DRM rules associated with the dongle 160 enforce the protection policies specified in the DRM rules associated with the source encrypted content 165. The encryption/decryption engine 230 re-encrypts the source encrypted content into a managed copy of the content, at 325. In particular, the encryption/decryption engine 230 decrypts the source encrypted content into a clear copy of the content. The encryption/decryption engine 230 then encrypts the clear copy of the content into a dongle encrypted content, which is also referred herein to as the managed copy. The dongle memory 240 may he utilized to store the source encrypted content, the content in the clear between decryption and encryption and/or the managed copy of the content. However, the dongle memory 240 is not accessible from outside the dongle 160 and therefore the content is not available in the clear outside the dongle 160.

Figure 4:
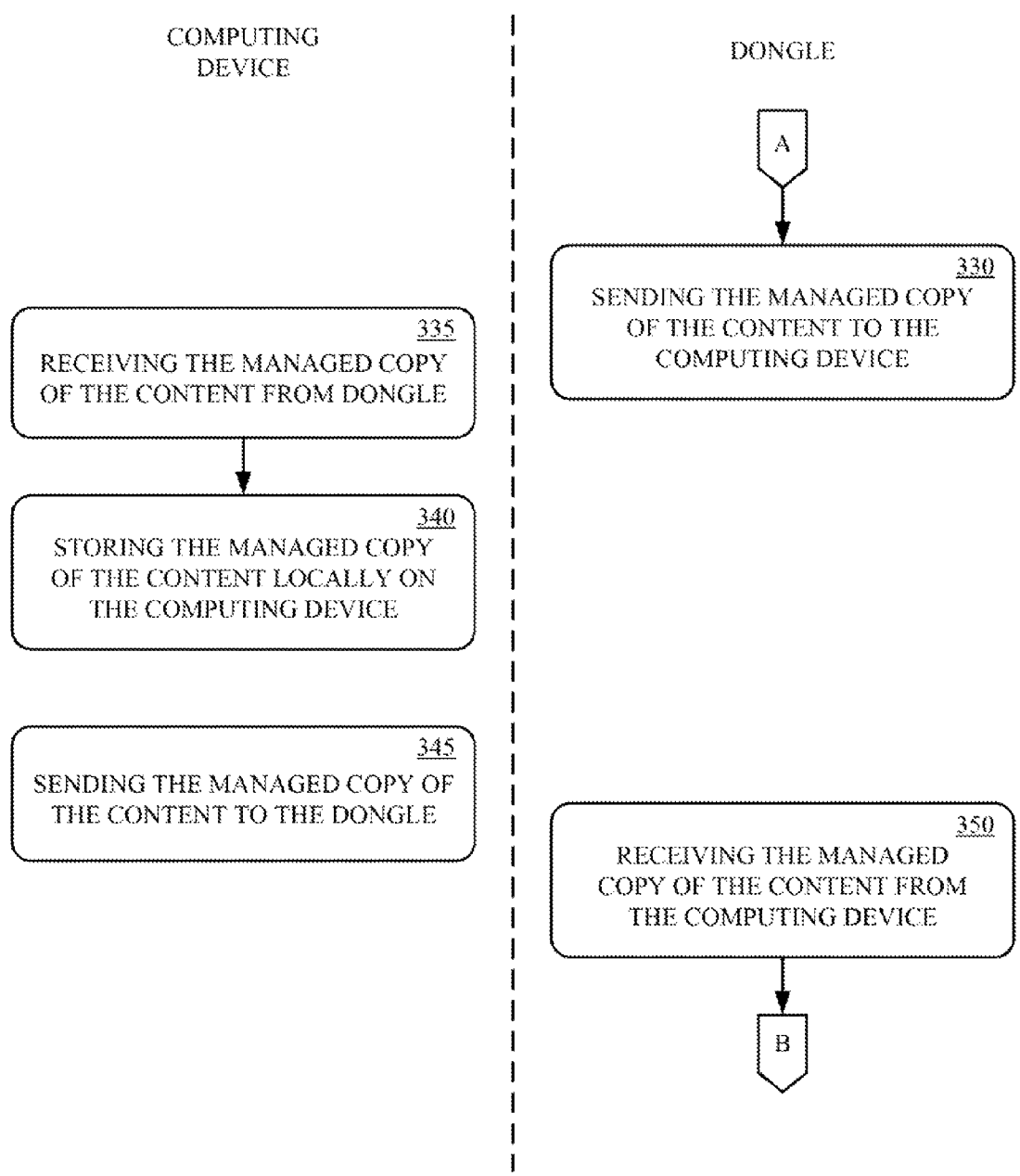

Referring now to FIG. 4, the managed copy is sent by the dongle 160 to the computing device 100, at 330. The managed copy may include or have associated with it the dongle DRM rules for protecting the given managed copy of the content and the metadata describing the content. At 335, the managed copy is received by a controller of the computing device-readable media 120 from the dongle 160. At 340, the managed copy 170, as illustrated in FIG. 1, may be stored in one or more computer readable media 115, 120 of the computing device 100. For instance, the managed copy 170 may be stored on the hard disk drive 120 of the computing device 100. In one implementation, the managed copy of the content 170 is transferred across a secure communication channel negotiated between the dongle 160 and a computing device readable media 115, 120 of the computing device 100.

Accordingly, the source encrypted content is locked to the source media and the managed copy is locked to the dongle 160. The managed copy of the content 170 can be stored locally on the computing device 100. However, the managed copy of the content is protected because it can only be decrypted by the dongle 160. The metadata is maintained in the clear and can be used to manipulate the content, whether the content is source encrypted content, a managed copy of the content, or a rendering copy of the content.

The method may also include the computing device 100 sending the managed copy of the content 170 to the dongle 160, at 345. At 350, the dongle 160 receives the managed copy 170 from the computing device. For instance, the managed copy of the content 170 stored locally on the hard disk drive 120 may be transferred back to the dongle 160. In one implementation, the managed copy 170 is transferred across a secure communication channel negotiated between the computing device 100 and the dongle 160.

Figure 5:
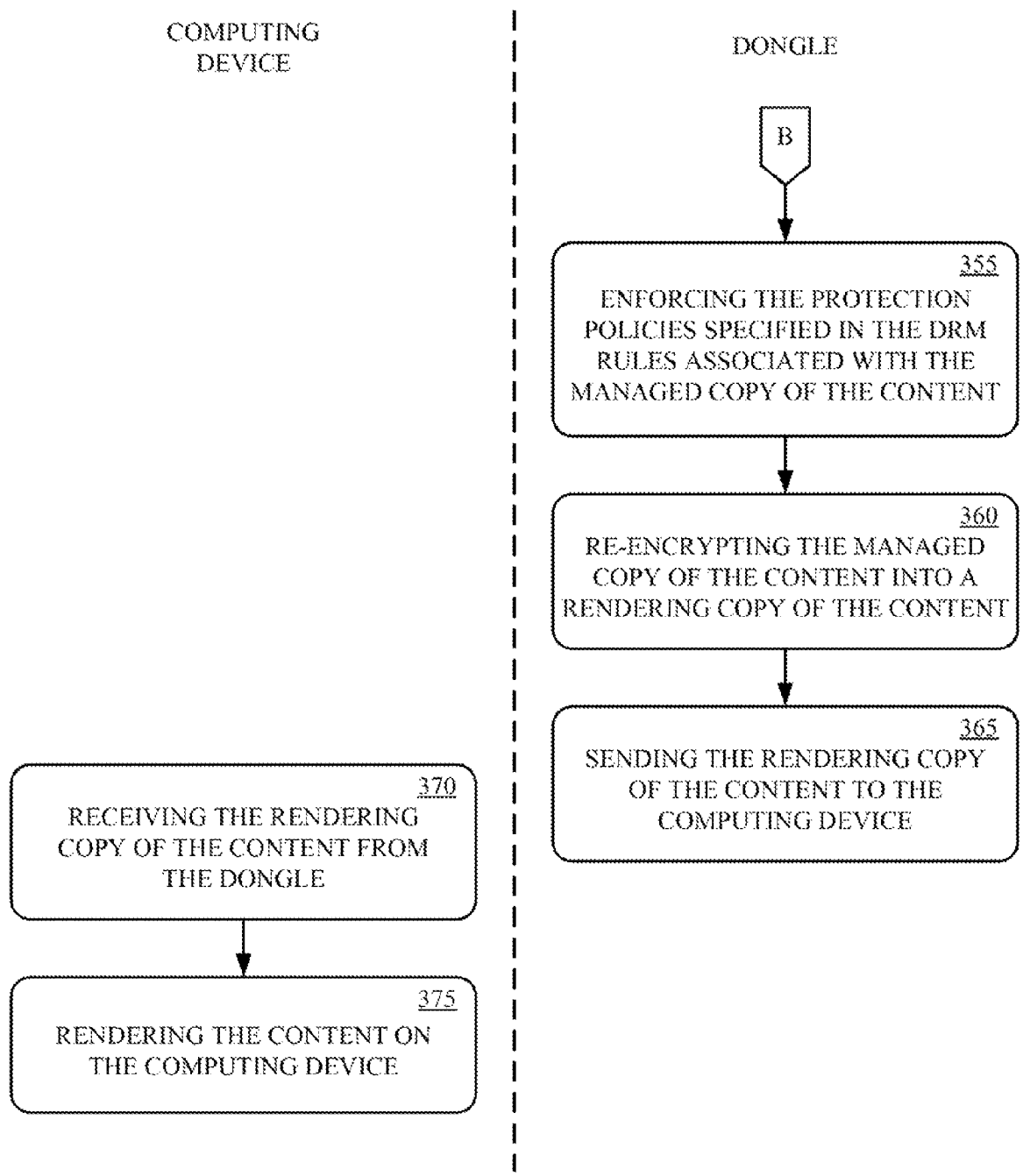

Referring now to FIG. 5, the DRM engine 220 enforces the protection policies specified in the DRM rules associated with the managed copy 170, at 355. At 360, the encryption/decryption engine 230 re-encrypts the managed copy of the content into a rendering copy of the content in accordance with enforcement of the DRM rules. In particular, the encryption/decryption engine 230 decrypts the managed copy, which is the dongle encrypted copy of the content, into a clear copy of the content. The encryption/decryption engine 230 then encrypts the clear copy of the content into the rendering encrypted content. For instance, the encryption/decryption engine 230 may encrypt the clear copy of the content using the public key of the video card 125, GPU or the like. The dongle memory 240 may be utilized to store the managed copy, the clear copy and/or the rendering copy of the content between decryption and encryption. However, as previously noted, the dongle memory 240 is not accessible from outside the dongle 160 and therefore the content is not available in the clear outside the dongle 160. Accordingly, the rendering copy of the content is locked to the video card 125, GPU or the like of the computing device 100.

At 365, the rendering copy is sent by the dongle 160 to the computing device 100. At 370, the rendering copy is received by the computing device 100 from the dongle 160. At 375, the rendering copy may be used by the video card 125, GPU or the like to render the content on the monitor 130 or the like, including decrypting the rendering content. In one implementation, the rendering copy of the content is transferred across a secure communication channel negotiated between the dongle 160 and the video card 125, GPU or the like of the computing device 100.

Figure 6:
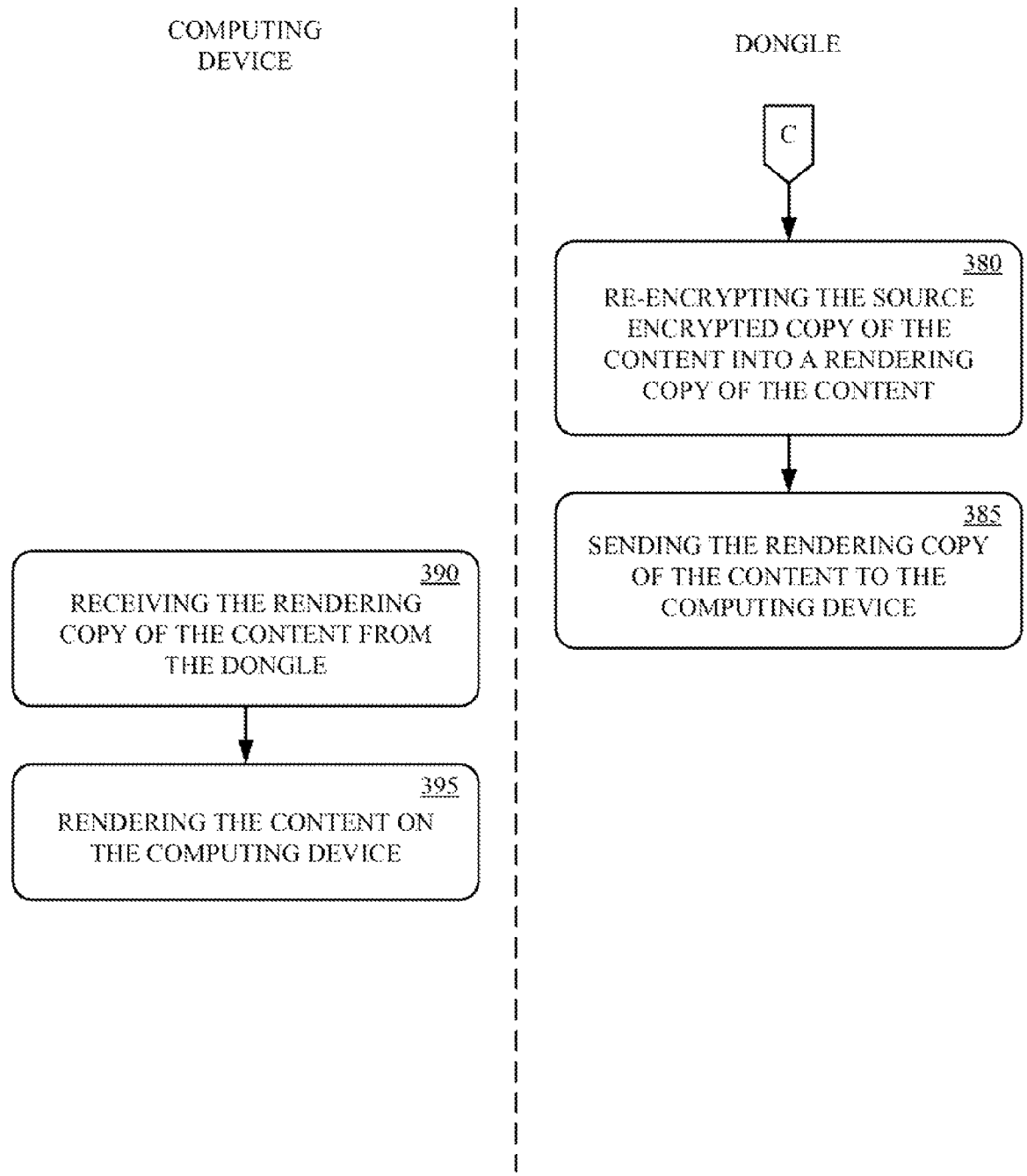

Referring again to FIG. 3, the method may further include receiving content 165 by the computing device 100, at 305. When the content includes source encrypted content 165, the content 165 is sent to the dongle 160, at 310. At 315, the dongle 160 receives the source encrypted content 165 from the computing device 100. The DRM engine 230 of the dongle 160 translates the DRM rules associated with the source encrypted content 165 into DRM rules associated with the dongle 160, at 320. Referring now to FIG. 6, the encryption/decryption engine 230 re-encrypts the source encrypted content into a rendering copy of the content, at 380. In particular, the encryption/decryption engine 230 decrypts the source encryption content into a clear copy of the content. The encryption/decryption engine 230 then encrypts the clear copy of the content into a rendering encrypted copy of the content. For instance, the encryption/decryption engine 230 may encrypt the clear copy of the content using the public key of the video card 125, GPU or the like. The dongle memory 240 may be utilized to store the source encrypted content, the content in the clear between decryption and encryption, and the rendering copy of the content. However, the dongle memory 240 is not accessible from outside the dongle 160 and therefore the content is not available in the clear outside the dongle 160.

At 385, the rendering copy is sent by the dongle 160 to the computing device 100. At 390, the rendering copy is received by the computing device 100 from the dongle 160. At 395, the rendering copy may be used by the video card 125, GPU or the like to render the content on the monitor 130 or the like, perhaps sending the rendered content to the monitor over a secure link such as HDMI. In one implementation, the rendering copy of the content is transferred across a secure communication channel negotiated between the dongle 160 and the video card 125, GPU or the like.

Accordingly, the dongle advantageously encrypts content for storage local to a computing device as a managed copy and/or for rendering by the computing device. Only the encryption/decryption dongle can decrypt the managed copy. In addition, digital rights management (DRM) protection utilizing the encryption/decryption dongle is operating system (OS) independent, and therefore can advantageously be applied on Open Source platforms, Linux platforms, MAC-OS platforms, Windows/Vista platforms and the like. In addition, the content is locked to the dongle rather than the CPU, hard disk drive, motherboard or the like. Accordingly, if the CPU, hard disk drive, motherboard or the like is replaced (e.g., upgraded), the content can still be available via the dongle The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A method of digital rights management comprising:

receiving source encrypted content at a computing device, wherein the computing device comprises a rendering module;

transferring the source encrypted content from the computing device to a dongle;

translating, by the dongle, a set of digital rights management rules associated with the source encrypted content to a set of digital rights management rules associated with the dongle;

generating, by the dongle, a managed copy of the source encrypted content by decrypting the source encrypted content, encrypting the decrypted source encrypted content using a dongle key and storing the managed copy in the memory of the dongle or in a storage media of the computing device;

decrypting the managed copy by the dongle and creating a rendering copy by re-encrypting the decrypted managed copy using a public key of the rendering module; and transmitting by the dongle the rendering copy to the rendering module.

2. The method according to claim 1, wherein the source encrypted content is locked to a source of the content.

3. The method according to claim 1, wherein the source encrypted content is transferred from the computing device to the dongle across a secure communication channel negotiated between the dongle and an input device that the source content was received on by the computing device.

4. The method according to claim 1, wherein the managed copy of content is transferred from the dongle to the computing device across a secure communication channel negotiated between the dongle and a controller of the computing device-readable media that the managed copy is stored on.

5. The method according to claim 1, wherein the rendering copy of the content is transferred from the dongle to the rendering module across a secure communication channel negotiated between the dongle and the rendering module.

6. The method according to claim 1, wherein the computing device comprises a computer.

7. The method according to claim 1, wherein the computing device comprises a game console.

8. The method according to claim 1, wherein the computing device comprises a digital video recorder.

9. The method according to claim 1, wherein the computing device comprises a home entertainment system.

10. The method according to claim 1, wherein re-encrypting the managed copy of content into the rendering copy of content includes:
   decrypting, by the dongle, the managed copy of the content, using the dongle key that is not accessible outside the dongle, into a clear copy of content not accessible from outside of the dongle; and
   encrypting, by the dongle, the clear copy of content, using the public key of the rendering module, into the rendering copy of content.

11. The method according to claim 1, wherein the managed copy of the content locked to the dongle further includes translating the set of digital rights management rules associated with the source encrypted content to the set of digital rights management rules associated with the dongle.

* * * * *